(12) United States Patent
Gormley

(10) Patent No.: US 11,434,850 B2
(45) Date of Patent: Sep. 6, 2022

(54) SPLIT SLEEVE HIDDEN DOOR THRUST REVERSER

(71) Applicant: Rohr, Inc., Chula Vista, CA (US)

(72) Inventor: Timothy Gormley, Bonita, CA (US)

(73) Assignee: Rohr, Inc., Chula Vista, CA (US)

( * ) Notice: Subject to any disclaimer, the term of this patent is extended or adjusted under 35 U.S.C. 154(b) by 663 days.

(21) Appl. No.: 16/390,724

(22) Filed: Apr. 22, 2019

(65) Prior Publication Data

US 2020/0025144 A1    Jan. 23, 2020

Related U.S. Application Data

(63) Continuation of application No. 14/534,988, filed on Nov. 6, 2014, now Pat. No. 10,309,343.

(51) Int. Cl.
| | |
|---|---|
| *F02K 1/76* | (2006.01) |
| *F02K 1/70* | (2006.01) |
| *F02K 1/72* | (2006.01) |
| *F02K 1/08* | (2006.01) |
| *F02K 1/06* | (2006.01) |
| *F02K 1/30* | (2006.01) |

(52) U.S. Cl.
CPC .............. *F02K 1/763* (2013.01); *F02K 1/70* (2013.01); *F02K 1/72* (2013.01); *F02K 1/766* (2013.01); *F02K 1/06* (2013.01); *F02K 1/08* (2013.01); *F02K 1/30* (2013.01); *F02K 1/76* (2013.01); *F05D 2220/36* (2013.01); *F05D 2260/50* (2013.01); *F05D 2260/56* (2013.01); *F05D 2260/57* (2013.01)

(58) Field of Classification Search
CPC ... F02K 1/763; F02K 1/70; F02K 1/72; F02K 1/62; F02K 1/625; F02K 1/76; F05D 2260/50
See application file for complete search history.

(56) References Cited

U.S. PATENT DOCUMENTS

| | | | |
|---|---|---|---|
| 2,950,595 A | 8/1960 | Laucher | |
| 3,036,431 A | 5/1962 | Vdolek | |
| 3,059,426 A | 10/1962 | Laucher | |
| 3,262,268 A | 7/1966 | Beavers | |
| 3,347,467 A * | 10/1967 | Anton | F02K 1/1246 239/265.31 |
| 3,621,763 A | 11/1971 | Geyer | |
| 3,703,258 A | 11/1972 | Wildner | |
| 3,779,010 A | 12/1973 | Chamay et al. | |
| 3,814,324 A | 6/1974 | Wanger | |
| 3,815,357 A | 6/1974 | Brennan | |

(Continued)

FOREIGN PATENT DOCUMENTS

| | | |
|---|---|---|
| EP | 0801221 A2 | 10/1997 |
| WO | 2012010774 A2 | 1/2012 |

*Primary Examiner* — Andrew H Nguyen
(74) *Attorney, Agent, or Firm* — Getz Balich LLC

(57) ABSTRACT

A system for a thrust reverser of an aircraft includes a primary sleeve and a secondary sleeve having cascades. The secondary sleeve is coupled to a set of blocker doors. The sliding motions of the primary sleeve and the secondary sleeve are not directly coupled when each moves between its stowed and deployed positions. The sliding motion of the primary sleeve may begin at a different time and continue at a different rate from the sliding motion of the secondary sleeve.

17 Claims, 9 Drawing Sheets

(56) References Cited

U.S. PATENT DOCUMENTS

| | | | |
|---|---|---|---|
| 3,829,020 | A * | 8/1974 | Stearns .................. F02K 1/827 |
| | | | 239/265.13 |
| 3,831,376 | A | 8/1974 | Moorehead |
| 3,981,451 | A * | 9/1976 | Prior ........................ F02K 1/72 |
| | | | 239/265.31 |
| 4,005,822 | A | 2/1977 | Timms |
| 4,145,877 | A | 3/1979 | Montgomery |
| 4,185,798 | A | 1/1980 | Dickenson |
| 4,278,220 | A | 7/1981 | Johnston et al. |
| 4,340,178 | A | 7/1982 | Lawson |
| 4,373,328 | A | 2/1983 | Jones |
| 4,564,160 | A | 1/1986 | Vermilye |
| 4,716,724 | A | 1/1988 | Newton |
| 4,731,991 | A | 3/1988 | Newton |
| 4,807,434 | A | 2/1989 | Jurich |
| 4,823,547 | A | 4/1989 | Newton |
| 4,894,985 | A | 1/1990 | Dubois et al. |
| 4,922,713 | A | 5/1990 | Barbarin et al. |
| 4,930,307 | A | 6/1990 | Newton |
| 5,228,641 | A | 7/1993 | Remlaoui |
| 5,309,711 | A | 5/1994 | Matthias |
| 5,655,360 | A | 8/1997 | Butler |
| 5,778,659 | A | 7/1998 | Duesler et al. |
| 5,806,302 | A | 9/1998 | Cariola et al. |
| 5,819,528 | A | 10/1998 | Masson |
| 5,987,880 | A | 11/1999 | Culbertson |
| 6,036,238 | A | 3/2000 | Lallament |
| 6,065,285 | A | 5/2000 | Gonidec et al. |
| 6,079,201 | A | 6/2000 | Jean |
| 6,082,096 | A | 7/2000 | Vauchel |
| 6,151,886 | A | 11/2000 | Vauchel |
| 6,158,211 | A | 12/2000 | Gonidec et al. |
| 6,170,254 | B1 | 1/2001 | Cariola |
| 6,256,980 | B1 | 7/2001 | Lecordix et al. |
| 6,340,135 | B1 | 1/2002 | Barton |
| 6,434,927 | B1 | 8/2002 | Stretton |
| 6,786,315 | B1 | 9/2004 | Christensen |
| 6,845,946 | B2 | 1/2005 | Lair |
| 6,895,742 | B2 | 5/2005 | Lair et al. |
| 7,127,880 | B2 | 10/2006 | Lair et al. |
| 7,146,796 | B2 | 12/2006 | Lair |
| 7,264,203 | B2 | 9/2007 | Lair |
| 7,484,356 | B1 | 2/2009 | Lair |
| 7,513,101 | B2 | 4/2009 | Eschborn et al. |
| 7,600,371 | B2 | 10/2009 | Sternberger |
| 8,109,467 | B2 | 2/2012 | Murphy |
| 8,127,532 | B2 | 3/2012 | Howe |
| 8,201,390 | B2 | 6/2012 | Sternberger |
| 8,578,699 | B2 | 11/2013 | Kubiak |
| 8,677,733 | B2 * | 3/2014 | Beardsley ............... F02K 3/075 |
| | | | 60/226.2 |
| 8,713,911 | B2 | 5/2014 | Kopecek et al. |
| 8,869,507 | B2 | 10/2014 | Cloft et al. |
| 8,899,013 | B2 | 12/2014 | Hurlin et al. |
| 8,938,944 | B2 | 1/2015 | Todorovic |
| 9,068,532 | B2 | 6/2015 | Gormley |
| 9,074,554 | B2 | 7/2015 | Caruel |
| 9,109,540 | B2 | 8/2015 | Vauchel |
| 9,181,898 | B2 | 11/2015 | Bhatt |
| 9,206,765 | B2 | 12/2015 | Vauchel |
| 9,212,624 | B2 | 12/2015 | Aten |
| 9,328,694 | B2 | 5/2016 | Todorovic |
| 9,410,502 | B2 | 8/2016 | Vauchel |
| 9,714,612 | B2 | 7/2017 | Lacko |
| 9,895,840 | B2 | 2/2018 | Bartel et al. |
| 10,018,151 | B2 | 7/2018 | Nakhjavani et al. |
| 2002/0144499 | A1 | 10/2002 | Rouyer et al. |
| 2003/0024236 | A1 | 2/2003 | Lymons et al. |
| 2004/0068978 | A1 | 4/2004 | Lair et al. |
| 2004/0195434 | A1 | 10/2004 | Parham |
| 2004/0195443 | A1 | 10/2004 | Lair |
| 2005/0039438 | A1 | 2/2005 | Lair |
| 2005/0151012 | A1 | 7/2005 | Lair |
| 2006/0005530 | A1 | 1/2006 | Blin et al. |
| 2006/0288688 | A1 | 12/2006 | Lair |
| 2007/0007388 | A1 | 1/2007 | Harrison et al. |
| 2007/0234707 | A1 | 10/2007 | Beardsley |
| 2009/0321561 | A1 | 12/2009 | Andre et al. |
| 2010/0024387 | A1 | 2/2010 | Marche |
| 2010/0218479 | A1 | 2/2010 | Moradell-Casellas et al. |
| 2010/0132331 | A1 | 6/2010 | Tsou et al. |
| 2010/0212286 | A1 | 8/2010 | West et al. |
| 2010/0212287 | A1 | 8/2010 | Kubiak |
| 2011/0167790 | A1 | 7/2011 | Cloft et al. |
| 2011/0277448 | A1 | 11/2011 | Roberts |
| 2012/0079805 | A1 | 4/2012 | Stuart et al. |
| 2012/0124963 | A1 | 5/2012 | Howe |
| 2012/0138707 | A1 | 6/2012 | Vauchel |
| 2012/0304621 | A1 | 12/2012 | Stuart et al. |
| 2013/0025259 | A1 | 1/2013 | Beardsley et al. |
| 2013/0160425 | A1 | 6/2013 | Scanlon et al. |
| 2013/0186219 | A1 | 7/2013 | Jones |
| 2013/0205753 | A1 | 8/2013 | Todorovic |
| 2013/0284822 | A1 | 10/2013 | Howarth et al. |
| 2013/0292490 | A1 | 11/2013 | Chapelain et al. |
| 2014/0110503 | A1 | 4/2014 | Teulou et al. |
| 2014/0131480 | A1 * | 5/2014 | Hurlin ................... F02K 1/566 |
| | | | 239/265.19 |
| 2014/0150403 | A1 | 6/2014 | Stuart et al. |
| 2015/0015965 | A1 | 1/2015 | Chen |
| 2015/0108249 | A1 | 4/2015 | James |
| 2015/0176528 | A1 | 6/2015 | Peyron |
| 2015/0308379 | A1 | 10/2015 | James |
| 2015/0308380 | A1 | 10/2015 | Biset |
| 2016/0025037 | A1 | 1/2016 | Teia Dos Santos Mendes Gomes |
| 2016/0131078 | A1 | 5/2016 | Gormley |
| 2016/0131082 | A1 | 5/2016 | Gormley |
| 2016/0153399 | A1 | 6/2016 | Sawyers-Abbott et al. |
| 2016/0169157 | A1 | 6/2016 | Sawyers-Abbott et al. |
| 2016/0230702 | A1 | 8/2016 | Charron et al. |
| 2016/0363097 | A1 | 12/2016 | Foutch |
| 2016/0369744 | A1 | 12/2016 | Gormley |
| 2017/0074211 | A1 | 3/2017 | Smith et al. |
| 2017/0107944 | A1 | 4/2017 | Kawai et al. |
| 2017/0152811 | A1 | 6/2017 | Acheson et al. |
| 2017/0167439 | A1 | 6/2017 | Crawford |

* cited by examiner

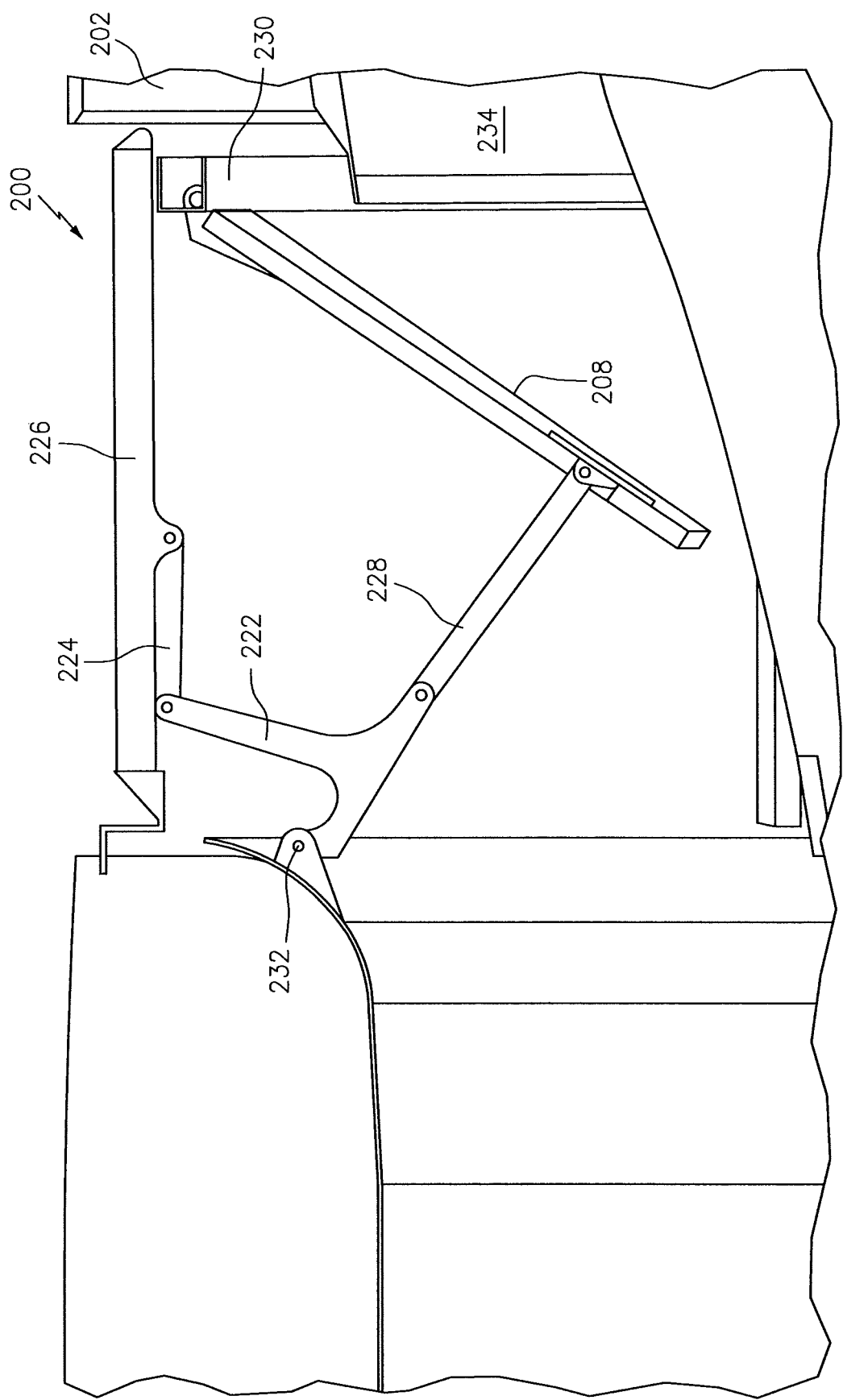

SPLIT SLEEVE HIDDEN DOOR THRUST REVERSER

This application is a continuation of U.S. patent application Ser. No. 14/534,988 filed Nov. 6, 2014, which is hereby incorporated herein by reference in its entirety.

BACKGROUND

Within a turbo fan engine that utilizes a cascade type thrust reverser, there are typically a plurality of blocker doors that deploy in order to redirect engine bypass air thru a set of cascades that turn the airflow out and forward in order to reverse the direction of the thrust of the engine. This may be done to slow an aircraft after landing. Referring to FIG. 1A, a system 100 is shown. The system 100 includes a sleeve 102 that is translated or moved in, e.g., an aft direction in order to expose cascades 104 as part of the deployment of the thrust reverser. Similarly, in order to place the thrust reverser in a stowed state (e.g., during flight) the sleeve 102 is translated or moved in, e.g., a forward (FWD) direction, such that the sleeve 102 may contact or abut a thrust reverser fixed structure 106. When in the stowed state, the cascades 104 are not exposed. FIG. 3 illustrates the system 100 in the stowed state. An entirety of a nacelle is shown in FIG. 3, whereas a portion (e.g., a half) of the nacelle is shown in FIG. 1A.

The blocker doors described above are typically pivotally attached to the sleeve 102 within the thrust reverser. FIG. 1B illustrates a blocker door 108 of the system 100 hinged to the sleeve 102 near a point 110. Additionally, the door 108 is attached to the inner fixed structure 114 of the thrust reverser via a drag link 112 that retains the door 108 in position during normal flight as well as aids in the deployment of the door 108 during thrust reverse mode. During flight, the door 108 forms, in part, the outer surface of a bypass duct. The drag link 112 crosses this bypass duct in attaching to the inner fixed structure.

The drag link 112 lies within the engine airflow and generates drag losses on the engine, resulting in degraded efficiencies. Any steps and gaps around the blocker door 108 generate aerodynamic disturbances that reduce overall efficiency.

Moreover, in conventional thrust reverser systems the actuation mechanism used to drive the sleeve 102 is the same mechanism that is used to drive the blocker door 108. Accordingly, the sleeve 102 and blocker door 108 are operated at the same speed and over commonly-defined distances (also referred to as strokes).

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a thrust reverser of an aircraft comprising: a primary sleeve, and a secondary sleeve coupled to a blocker door, wherein a stroke associated with the primary sleeve is different from a stroke associated with the secondary sleeve. In some embodiments, the secondary sleeve is coupled to a first link, and the first link is coupled to a crank, and the crank is coupled to a second link, and the second link is coupled to the blocker door. In some embodiments, the first link is configured to be oriented in a substantially axial direction relative to an axis of the thrust reverser when the thrust reverser is fully deployed. In some embodiments, the blocker door is configured to provide load from the blocker door through the second link and the crank to a fixed structure of the aircraft. In some embodiments, the thrust reverser further comprises a ring configured to couple to the blocker door. In some embodiments, the blocker door is configured to be stowed above a skin associated with at least one of the primary sleeve and a duct when the thrust reverser is stowed. In some embodiments, the primary sleeve and the secondary sleeve are configured to be driven via independent actuation mechanisms.

Aspects of the disclosure are directed to a thrust reverser of an aircraft comprising: a movable primary sleeve with an exterior surface exposed to the exterior free air stream around the thrust reverser during flight, the primary sleeve movable between a stowed position and a deployed position corresponding to reverse thrust operation, a movable secondary sleeve that includes a cascade for redirecting air from a fan duct during reverse thrust operation, the secondary sleeve movable between a stowed position and a deployed position corresponding to reverse thrust operation, and wherein the primary sleeve covers the cascade when the primary sleeve is in its stowed position, and the cascade is exposed to the exterior free air stream when the primary sleeve is in its deployed position. In some embodiments, the thrust reverser further comprises: a blocker door coupled to the secondary sleeve, the blocker door movable between a stowed position and a deployed position corresponding to reverse thrust operation, and wherein the blocker door is driven from its stowed position to its deployed position when the secondary sleeve moves from its stowed position to its deployed position. In some embodiments, the primary sleeve further comprises an interior skin and an exterior skin, the blocker door being fully positioned between the interior skin and the exterior skin when the blocker door is in its stowed position. In some embodiments, the thrust reverser further comprises: a first sliding mechanism coupled with the primary sleeve such that the primary sleeve is movable by sliding relating to a fixed structure of the thrust reverser along a sliding axis defined by the first sliding mechanism, and a second sliding mechanism coupled with the secondary sleeve such that the secondary sleeve is movable by sliding relating to a fixed structure of the thrust reverser along a sliding axis defined by the second sliding mechanism.

Aspects of the disclosure are directed to a thrust reverser of an aircraft comprising: a movable primary sleeve with an exterior surface exposed to the exterior free air stream around the thrust reverser during flight, the primary sleeve movable between a stowed position and a deployed position corresponding to reverse thrust operation, a movable secondary sleeve, the secondary sleeve movable between a stowed position and a deployed position corresponding to reverse thrust operation, a blocker door coupled to the secondary sleeve and movable between a stowed position and a deployed position corresponding to reverse thrust operation wherein the blocker door redirects air through a cascade, wherein when the secondary sleeve moved from its stowed position to its deployed position it drives the blocker door from its stowed position to its deployed position. In some embodiments, the cascade is mounted on and moves with the secondary sleeve. In some embodiments, at least a portion of the cascade radially overlaps a fan case of a turbofan engine, such as when the secondary sleeve is in a stowed position. In some embodiments, the blocker door is hidden from exposure to the air stream in a fan duct when the blocker door is in its stowed position.

Aspects of the disclosure are directed to a system for a thrust reverser of an aircraft comprising: fixed structure of the aircraft, and a blocker door pivotally supported by the fixed structure. In some embodiments, the system further comprises a primary sleeve, and a secondary sleeve coupled to the blocker door, wherein a stroke associated with the primary sleeve is different from a stroke associated with the secondary sleeve. In some embodiments, the primary sleeve and the secondary sleeve are configured to be driven via independent actuation mechanisms. In some embodiments, the system further comprises: a first link coupled to the secondary sleeve, a crank coupled to the first link, and a second link coupled to the crank, wherein the second link is coupled to the blocker door. In some embodiments, the first link is configured to be oriented in a substantially axial direction relative to an axis of the thrust reverser when the thrust reverser is fully deployed. In some embodiments, the blocker door is configured to provide load from the blocker door through the second link and the crank to the fixed structure. In some embodiments, the system further comprises a ring located aft of the fixed structure coupled to the blocker door.

BRIEF DESCRIPTION OF THE DRAWINGS

The present disclosure is illustrated by way of example and not limited in the accompanying figures in which like reference numerals indicate similar elements.

FIGS. 2A-2C schematically illustrate a thrust reverser system in accordance with aspects of the disclosure.

DETAILED DESCRIPTION

Figure 1A:
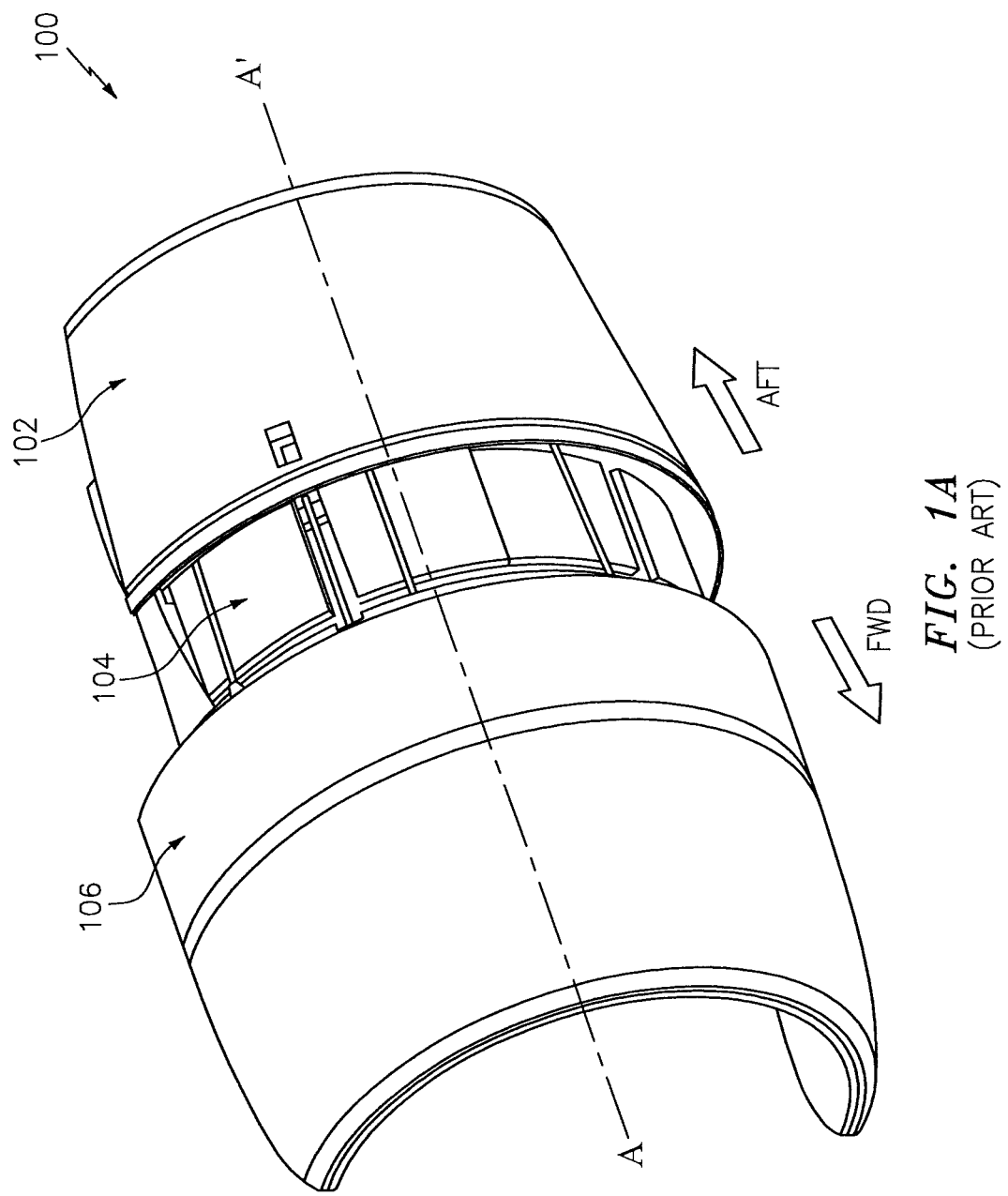
FIG. 1A schematically illustrates a thrust reverser system incorporating a translating sleeve in accordance with the prior art.
Figure 1B:
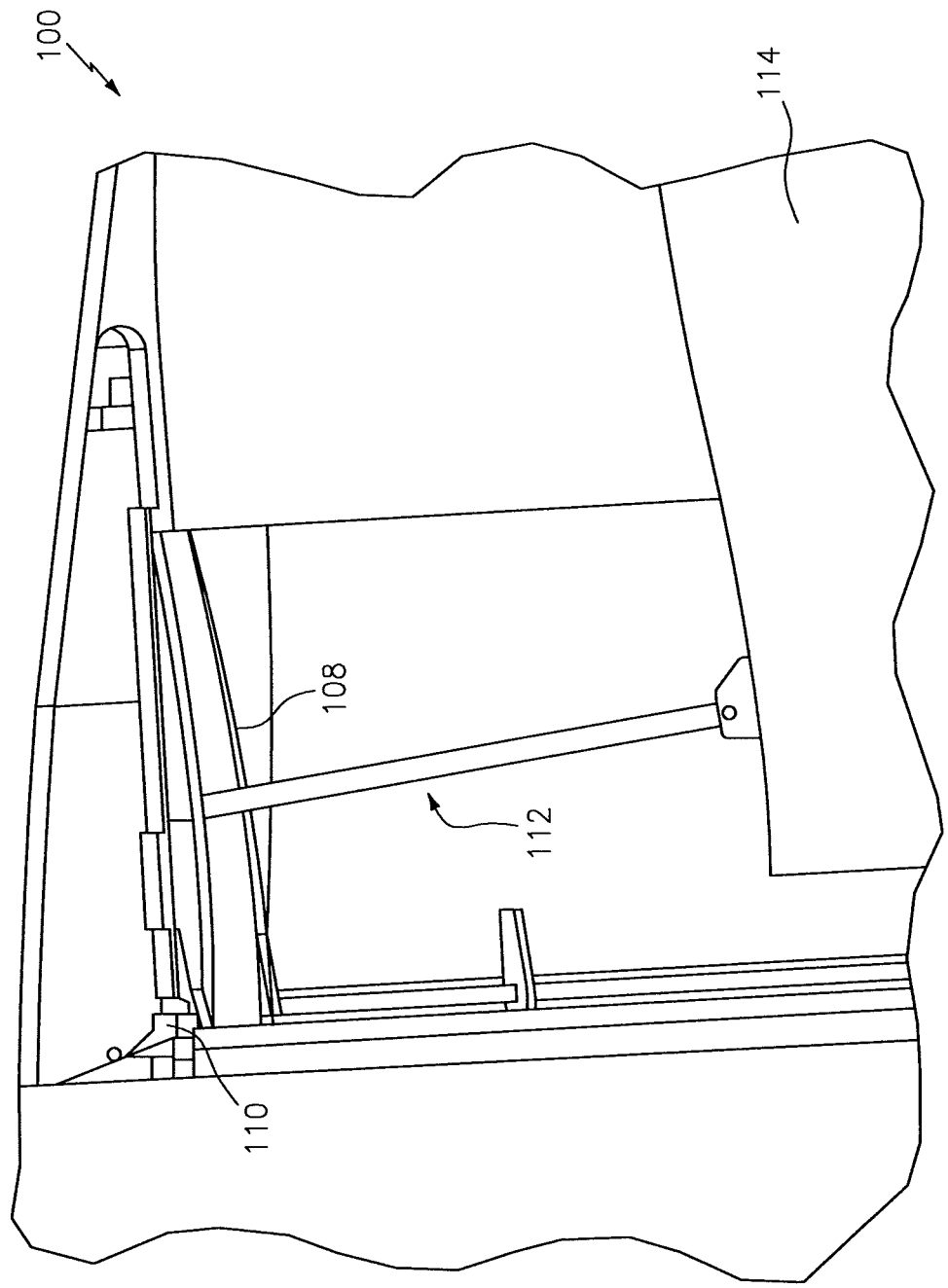
FIG. 1B schematically illustrates a drag link of the system of FIG. 1A in accordance with the prior art.

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

In accordance with various aspects of the disclosure, apparatuses, systems and methods are described for making and using a translating cascade thrust reverser. In some embodiments, a translating cascade/secondary sleeve and a blocker door/primary sleeve can be operated via separate actuation or drive mechanisms, potentially in accordance with timing criteria (e.g., mechanically-based timing criteria).

Figure 2A:
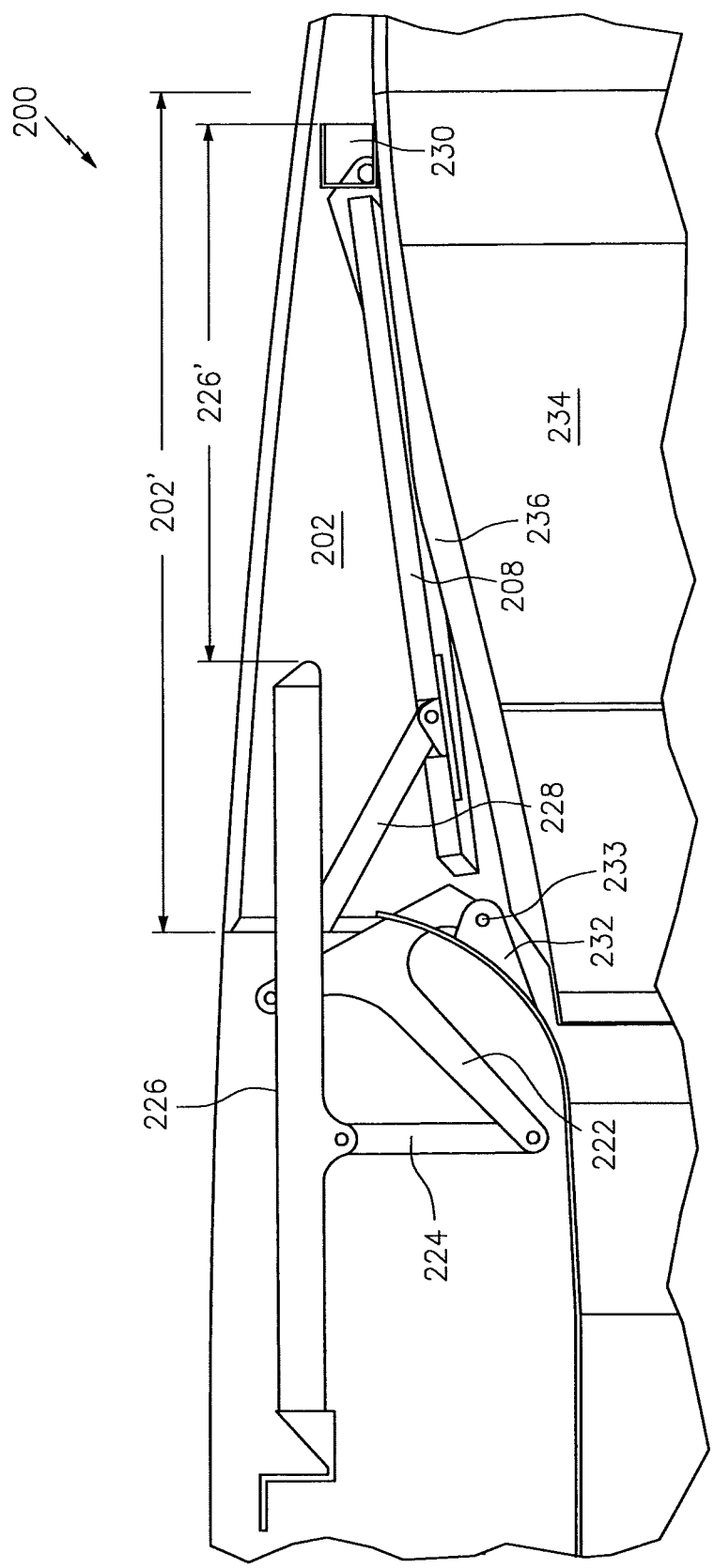
Figure 2B:
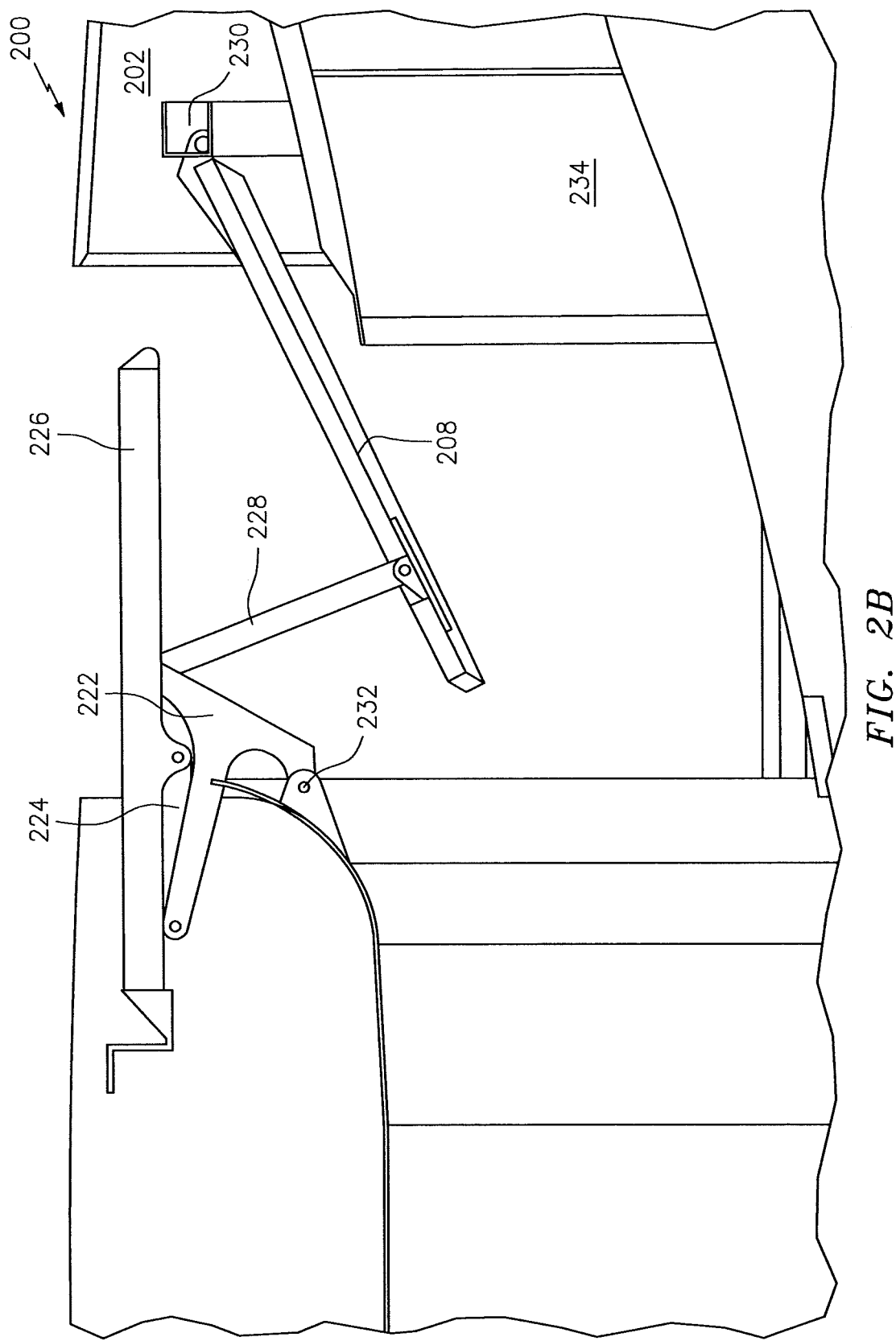
Figure 3:
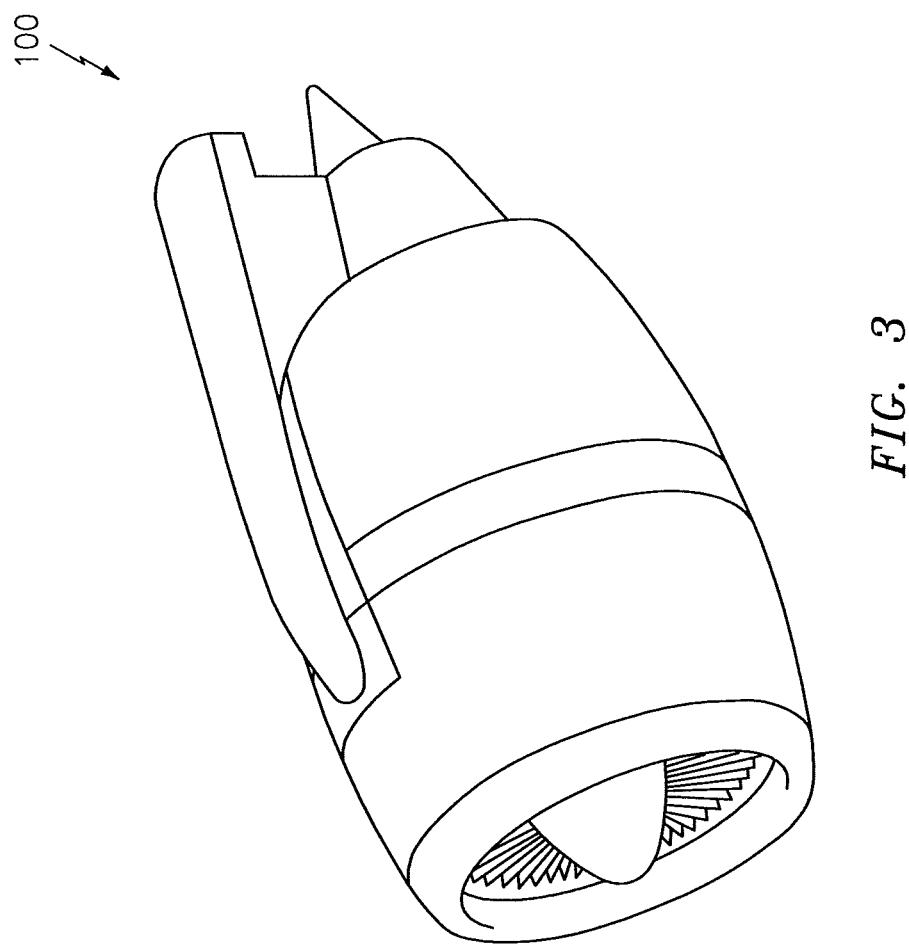
FIG. 3 illustrates a nacelle incorporating a thrust reverser.

Referring to FIGS. 2A-2C, a system 200 is shown. The system 200 includes a number of components/devices that are described further below. The views shown in FIGS. 2A-2C may represent a cross-section of a thrust reverser or nacelle, such as about the line A-A' of FIG. 1A.

The system 200 includes a crank 222, which may be referred to as (or correspond to) a main crank. The crank 222 is coupled to a driver link 224. The driver link 224 is coupled to a translating cascade 226, where the translating cascade 226 may be referred to as (or correspond to) a secondary sleeve. The translating cascade 226 may be coupled to one or more sliders (not shown) to support movement or translation of the translating cascade 226.

The crank 222 is coupled to a blocker link 228. The blocker link 228 is coupled to a blocker door 208. The blocker door 208 is coupled to a ring 230, which may be referred to as (or correspond to) an aft ring.

The blocker door 208 is similar to the blocker door 108 of the system 100. The blocker door 208 may be hidden in the sense that the majority or the entirety of its structure is not exposed to any fan bypass air flow in the fan duct during normal operation. By hiding the door 208, thrust reverser performance may be maximized/enhanced by allowing for a very smooth duct surface (free from or with significantly reduced steps and gaps) on skin 236, reducing the drag. In addition, because the blocker door geometry is no longer constrained or driven by the need to create an aerodynamically smooth surface when the door is stowed, the shape, geometry, or configuration of the door 208 may be selected to obtain improved or optimal thrust reverser performance.

The crank 222 is coupled to a structure 232 of the aircraft at a (pivot) point 233. The structure 232 may represent fixed structure of an aircraft and a direct load path into a torque box (not shown).

As shown in FIG. 2A, a sleeve 202 (which is similar to the sleeve 102 of the system 100) and a duct 234 are included as part of the system 200. The sleeve 202 may be referred to as a primary sleeve herein. The door 208 may reside above a skin 236 of the sleeve 202 and/or duct 234 when the thrust reverser is operated in the stowed state.

The system 200 may include a number of four-bar mechanisms. A first four-bar mechanism may include the crank 222, the driver link 224, the translating cascade 226, and the structure 232. A second four-bar mechanism may include the crank 222, the blocker link 228, the blocker door 208, and the structure 232.

Superimposed in FIG. 2A is an illustration of a first stroke 202' associated with the sleeve 202 relative to a second stroke 226' associated with the translating cascade 226. As used herein a stroke refers to the potential distance that a respective element may traverse. As shown in FIG. 2A, the first stroke 202' is different from the second stroke 226'.

In the progression from FIG. 2A to FIG. 2B and from FIG. 2B to FIG. 2C, the blocker door 208 transitions from a stowed state (FIG. 2A), to a state between stowed and deployed (e.g., 50% deployed) (FIG. 2B), to a deployed state (FIG. 2C). FIG. 2B may represent.

The greatest loads are generally experienced by the system 200 when the thrust reverser is fully deployed (e.g., FIG. 2C). In FIG. 2C, the driver link 224 is oriented in a substantially axial direction relative to an axis or center-line of the thrust reverser. Accordingly, any bending in the translating cascade 226 is minimized/reduced because the load introduced by the driver link 224 to the cascade 226 is in line with the cascade axial direction and only slightly offset. In addition, load from the blocker door 208 is provided through the blocker link 228 and the crank 222 to the structure 232, which is a structurally efficient load path and also minimizes bending because the blocker link 228 is in line and parallel with the load path through the crank 222.

As shown in FIGS. 2A-2C, the door 208 is pivotally supported with respect to the fixed structure (e.g., structure 230 and 232), as opposed to being pivotally supported by the sleeve 202.

Figure 4A:
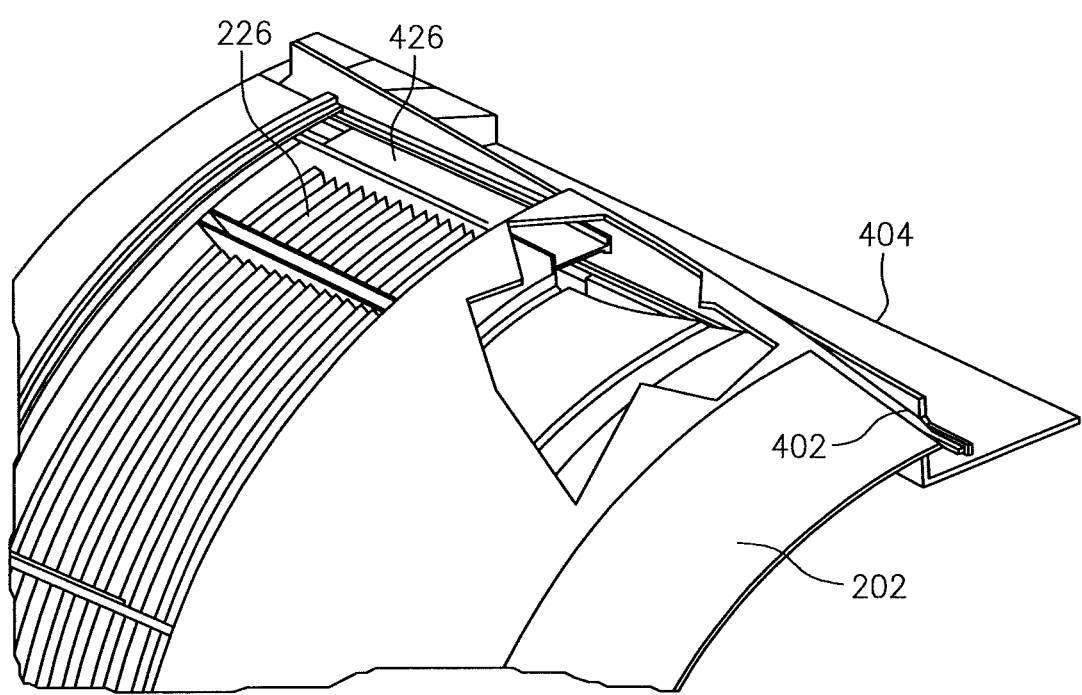
FIGS. 4A-4B illustrate the thrust reverser of FIGS. 2A-2C in a deployed condition.
Figure 4B:
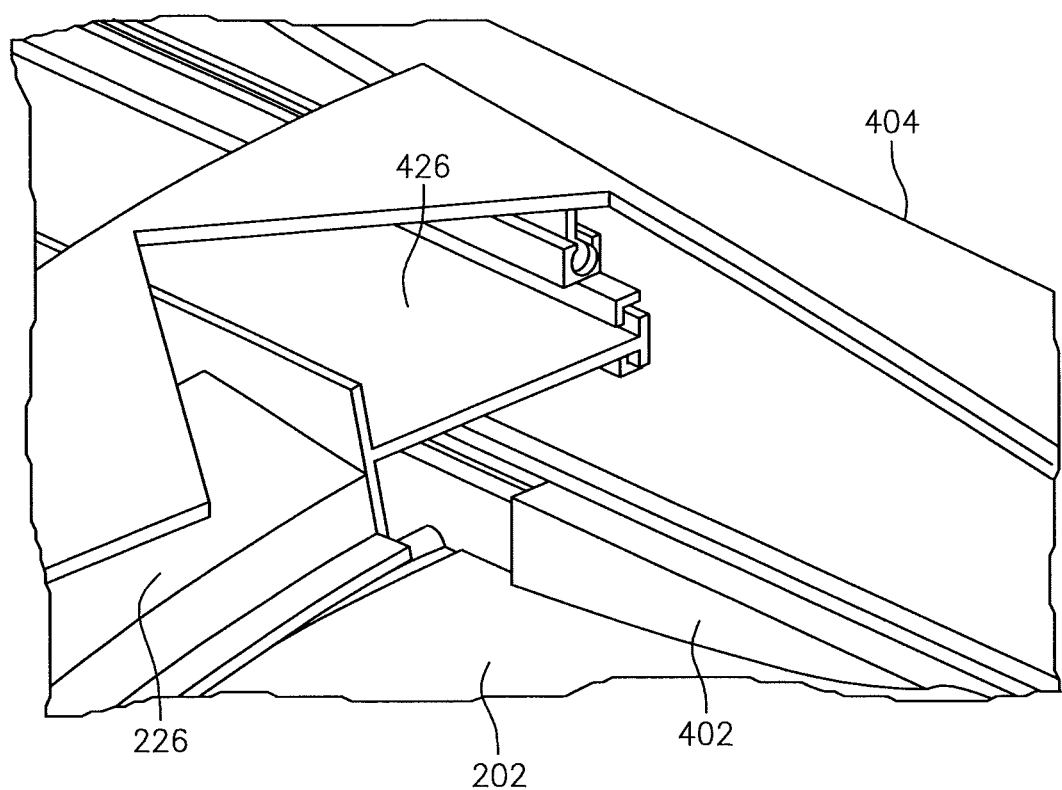

FIGS. 4A and 4B illustrate the thrust reverser from FIGS. 2A through 2C in the deployed condition, and include a view of the sliding mechanisms for the sleeve 202 and the translating cascade/secondary sleeve 226. Because they move at different rates, times and have different strokes, the sliding mechanisms for each are separate. A sliding mechanism 402 serves the sleeve 202. Sliding mechanism 402 includes a portion that is mounted to sleeve 202 and a portion that is mounted to a hinge beam 404, and the two portions are configured to slide relative to one another. Likewise, sliding mechanism 426 serves the secondary sleeve 226, and includes a portion that is mounted to secondary sleeve 226 and a portion that is mounted to the hinge beam 404, and the two portions are configured to slide relative to one another. This allows the primary sleeve 202 and the secondary sleeve 226 to move independently of one another. Those of ordinary skill in this art will also recognize that similar sliding mechanisms may be included at the six o'clock position of the primary sleeve 202 and the secondary sleeve 226 in some embodiments.

Figure 5A:
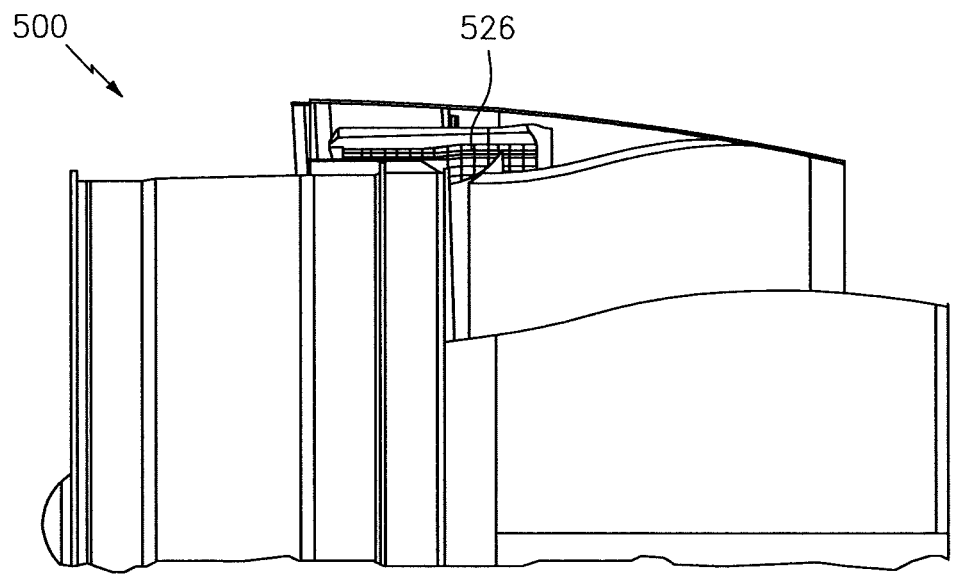
FIGS. 5A-5B illustrate a thrust reverser in accordance with aspects of the disclosure.
Figure 5B:
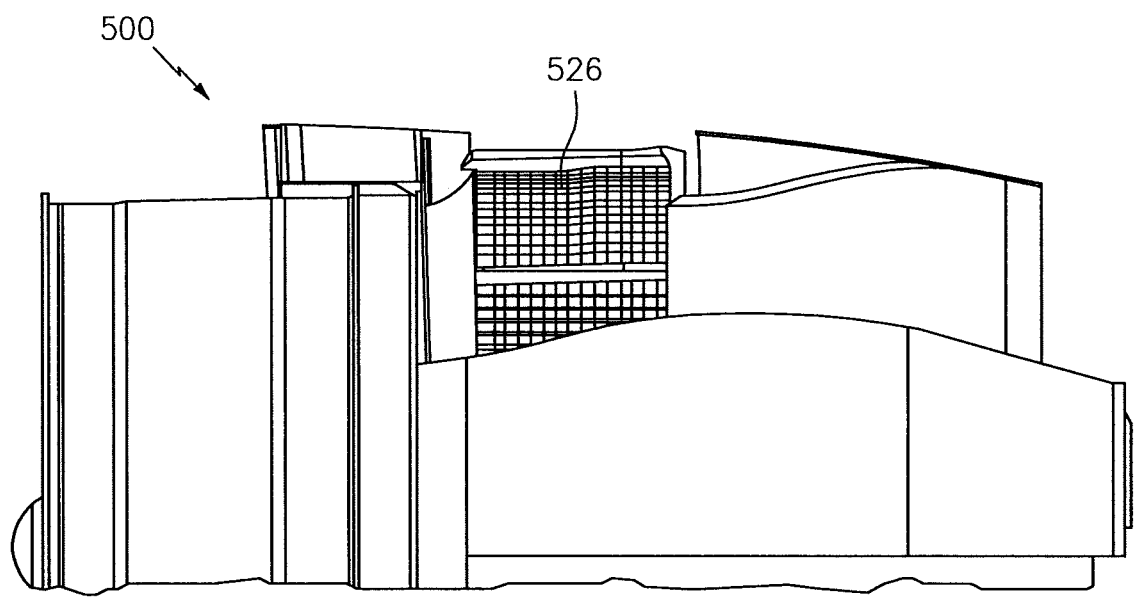

FIGS. 5A-5B schematically illustrate cross-sectional views of a cascade and propulsion system 500 similar to the arrangements described above in connection with FIGS. 2A-2C and 4A-4C. In particular, FIGS. 5A-5B illustrate that when a thrust reverser is in a stowed condition/state cascades 526 partially or completely overlap (in the radial direction of the system 500) the fan case, and in the deployed condition/state there is no overlap, the forward edge of the cascade assembly 526 is about in-line with the trailing edge of the fan case, and the cascades 526 are exposed.

The primary sleeve 202 and the secondary sleeve 226 may be actuated in conventional and known manners, as will be recognized by those of ordinary skill in this art. A pneumatic, hydraulic or lead screw actuator may be positioned between each sleeve and any fixed structure of the thrust reverser in order to control the deployment of each sleeve. It may also be possible to use a single actuator to deploy both sleeves, with special arrangements made so that the sleeves can begin their deployment at different times and deploy at different rates and with different strokes.

While some of the examples were described above in connection with a translating cascade reverser, one skilled in the art would appreciate that aspects of the disclosure may be applied in connection with any type of reverser, such as a secondary sleeve reverser and/or conventional reversers including those with fixed nozzles/trailing edges. Further, the mechanism can be tailored for transient and deployed area match as may be required for a particular application.

Technical effects and benefits of the disclosure include obtaining a maximum/increased efficiency in terms of engine operation/output by minimizing/reducing drag losses. Additionally, the size/profile of one or more components/devices may be minimized/reduced, allowing for shorter lines of travel and better/different packaging options. Configuring the cascade so that it overlies the fan case when stowed should allow for the thrust reverser to be shorter than would otherwise be the case. Separating a translating cascade/secondary sleeve stroke from a primary sleeve stroke facilitates the design feature of positioning the cascade over the fan case in its stowed position.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure.

I claim:

1. A thrust reverser for an aircraft, comprising:
   a first sleeve;
   a second sleeve including a cascade configured to redirect air flow, the second sleeve configured to move axially along an axis of the thrust reverser; and
   a blocker door coupled to the second sleeve;
   the first sleeve and the second sleeve configured to be moved by separate sliding devices;
   wherein the thrust reverser is configured such that movement of the second sleeve drives movement of the blocker door; and
   wherein the blocker door is configured to be stowed above a skin of the first sleeve when the thrust reverser is stowed;
   a first link coupled to the second sleeve;
   a crank coupled to the first link; and
   a second link coupled to the crank and to the blocker door.

2. The thrust reverser of claim 1, wherein a stroke associated with the first sleeve is longer than a stroke associated with the second sleeve.

3. The thrust reverser of claim 2, wherein
   the stroke associated with the first sleeve is indicative of a distance traveled by the first sleeve between a stowed positioned of the first sleeve and a fully deployed position of the first sleeve; and
   the stroke associated with the second sleeve is indicative of a distance traveled by the second sleeve between a stowed positioned of the second sleeve and a fully deployed position of the second sleeve.

4. The thrust reverser of claim 1, wherein
   the blocker door is configured to provide load from the blocker door through the second link and the crank to a fixed structure of the aircraft;
   the first sleeve comprises an exterior surface exposed to an exterior free air stream around the thrust reverser during flight, and the first sleeve is movable between a first sleeve stowed position and a first sleeve deployed position;
   the second sleeve is movable between a second sleeve stowed position and a second sleeve deployed position; and
   the first sleeve covers the cascade when the first sleeve is in the first sleeve stowed position, and the cascade is exposed to the exterior free air stream when the first sleeve is in the first sleeve deployed position.

5. The thrust reverser of claim 1, wherein the first link is configured to be oriented in a substantially axial direction relative to the axis of the thrust reverser when the thrust reverser is fully deployed.

6. The thrust reverser of claim 1, wherein the blocker door is configured to provide load from the blocker door through the second link and the crank to a fixed structure of the aircraft.

7. The thrust reverser of claim 1, further comprising a ring coupled to the blocker door.

8. The thrust reverser of claim 1, further comprising:
   a fixed structure configured to be within a compartment of the first sleeve when the first sleeve is in a stowed position;

wherein the blocker door is pivotally mounted to the fixed structure.

9. The thrust reverser of claim 1, further comprising:
a structure configured to be within a compartment of the first sleeve when the first sleeve is in a stowed position;
wherein the first sleeve moves relative to the structure when the first sleeve moves between the stowed position and a deployed position; and
wherein the blocker door is pivotally mounted to the structure.

10. A thrust reverser for an aircraft, comprising:
a duct;
a first sleeve;
a second sleeve comprising a cascade configured to redirect air flow;
a blocker door coupled to the second sleeve;
a first sleeve actuator configured to translate the first sleeve; and
a second sleeve actuator configured to translate the second sleeve, the second sleeve actuator separate from the first sleeve actuator;
wherein the thrust reverser is configured such that movement of the second sleeve causes movement of the blocker door into and out of the duct,
wherein the blocker door is configured to be stowed above a skin of the first sleeve when the thrust reverser is stowed, and
wherein the second sleeve is outside of the duct when the thrust reverser is deployed;
a first link coupled to the second sleeve;
a crank coupled to the first link; and
a second link coupled to the crank and to the blocker door.

11. The thrust reverser of claim 10, wherein a stroke associated with the first sleeve is longer than a stroke associated with the second sleeve.

12. The thrust reverser of claim 10, wherein
the blocker door is configured to provide load from the blocker door through the second link and the crank to a fixed structure of the aircraft;
the first sleeve comprises an exterior surface exposed to an exterior free air stream around the thrust reverser during flight, and the first sleeve is movable between a first sleeve stowed position and a first sleeve deployed position;
the second sleeve is movable between a second sleeve stowed position and a second sleeve deployed position; and the first sleeve covers the cascade when the first sleeve is in the first sleeve stowed position, and the cascade is exposed to the exterior free air stream when the first sleeve is in the first sleeve deployed position.

13. The thrust reverser of claim 10, further comprising a ring coupled to the blocker door.

14. The thrust reverser of claim 10, further comprising:
a fixed structure configured to be within a compartment of the first sleeve when the first sleeve is in a stowed position;
wherein the blocker door is pivotally mounted to the fixed structure.

15. The thrust reverser of claim 10, further comprising:
a structure configured to he within a compartment of the first sleeve when the first sleeve is in a stowed position;
wherein the first sleeve moves relative to the structure when the first sleeve moves between the stowed position and a deployed position; and
wherein the blocker door is pivotally mounted to the structure.

16. A thrust reverser for an aircraft, comprising:
a duct;
a first sleeve;
a second sleeve comprising a cascade configured to redirect air flow;
a blocker door coupled to the second sleeve;
a first sleeve actuator configured to translate the first sleeve; and
a second sleeve actuator configured to translate the second sleeve, the second sleeve actuator separate from the first sleeve actuator;
wherein the thrust reverser is configured such that movement of the second sleeve actuates movement of the blocker door into and out of the duct;
wherein the blocker door is configured to be stowed in an internal cavity of the first sleeve when the thrust reverser is stowed; and
wherein the second sleeve is outside of the duct when the thrust reverser is deployed;
a first link coupled to the second sleeve;
a crank coupled to the first link; and
a second link coupled to the crank and to the blocker door.

17. The thrust reverser of claim 16, wherein the first sleeve includes a first skin and a second skin, and the internal cavity is formed radially between the first skin and the second skin.

* * * * *